United States Patent [19]

Nace

[11] 4,210,408

[45] Jul. 1, 1980

[54] ECCENTRIC PIN POSITIVE LOCKING DEVICE FOR HYDRAULIC TURBINE WICKET GATES

[75] Inventor: Donald W. Nace, York, Pa.

[73] Assignee: Allis-Chalmers Corporation, Milwaukee, Wis.

[21] Appl. No.: 956,093

[22] Filed: Oct. 30, 1978

[51] Int. Cl.² .................................................. F03B 3/18
[52] U.S. Cl. ...................................... 415/163; 415/160
[58] Field of Search ................ 415/150, 160, 161, 162, 415/163, 164

[56] References Cited

U.S. PATENT DOCUMENTS

| 1,607,773 | 11/1926 | Moody | 415/161 |
| 2,819,732 | 1/1958 | Paetz | 415/160 X |
| 3,824,032 | 7/1974 | Schegolev | 415/163 X |
| 3,901,624 | 8/1975 | Mayo, Jr. et al. | 415/163 X |

FOREIGN PATENT DOCUMENTS 616417  3/1961  Canada ..................................... 415/160

Primary Examiner—Leonard E. Smith
Attorney, Agent, or Firm—Robert C. Jones

[57] ABSTRACT

A hydraulic turbine wicket gate operating assembly including an eccentric pin having a separate hexagonal spacer attached provides a novel means for turning the eccentric pin and fixing it from rotation beyond a desired point. With the arrangement, a single gate operating ring can be utilized to permit all of the gates to move in unison and to provide for the simultaneous closing of each gate against each adjacent gate.

7 Claims, 2 Drawing Figures

ECCENTRIC PIN POSITIVE LOCKING DEVICE FOR HYDRAULIC TURBINE WICKET GATES

BACKGROUND OF THE INVENTION

Operation of the wicket gates of a hydraulic turbine must be accomplished simultaneously in unison. This, of course, means that all of the gates must be adjusted and locked in the adjusted position so that a simultaneous movement can be accomplished.

Prior means for locking the wicket gate links against the eccentric pin made the adjustment of the eccentric pins difficult in that the eccentric pin was turned by means of a wrench on a flat portion of the eccentric pin which extended above a locknut. When proper adjustment was attained, the eccentric pin had to be held in the adjusted position with one wrench while the clamping nuts were tightened securely by means of two additional wrenches. The integrity of the adjustment depended on the friction developed between the links and the eccentric pin. Under conditions of vibration, the adjustment was found to have moved thereby destroying the simultaneous closing operation of the wicket gates.

The present invention is directed to providing a more positive means of adjusting the eccentric pin. The invention also concerns itself with providing a positive lock to maintain the eccentric pin in an adjusted position. It is also within the scope of the invention to provide a wicket gate operating mechanism which is precisely adjustable with locking means to maintain the adjustment and which is easily disassembled for maintenance and reassembly to the exact same adjusted relationship without the necessity of a difficult readjustment procedure.

DESCRIPTION OF THE INVENTION

Figure 1:
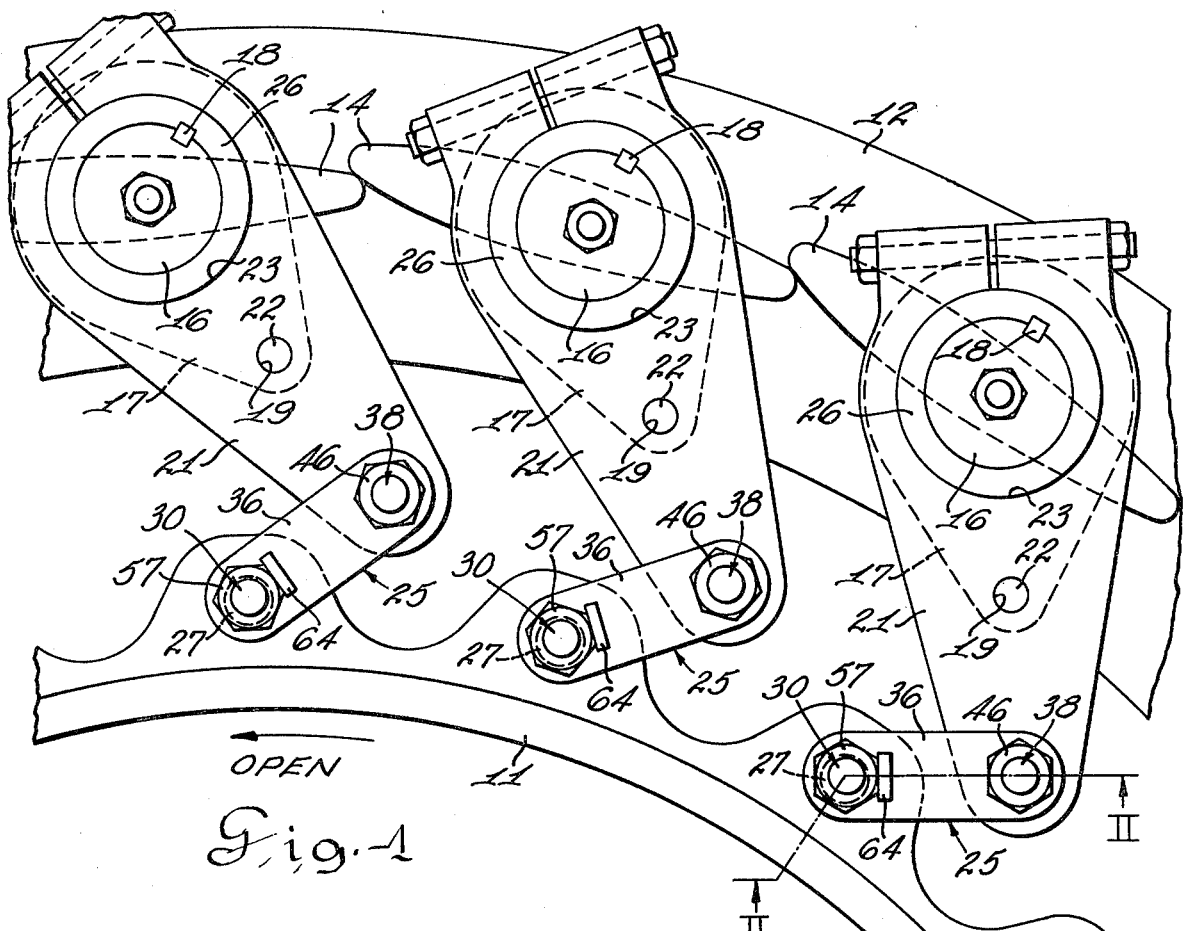
FIG. 1 is an enlarged fragmentary plan view of a portion of a wicket gate assembly with operators for the several wicket gates and a single actuator therefor in which the present invention is incorporated; and, FIG. 2 is an enlarged view of a wicket gate operator in which the present invention is incorporated, taken in a plane represented by the line II—II in FIG. 1.

Referring to FIG. 1, the hydraulic turbine includes a gate operating ring 11. An annular head cover 12 is an integral part of the hydraulic turbine and provides a support for pivotally mounting a plurality of wicket gates 14 circumferentially spaced about the axis of the turbine runner (not shown). Each wicket gate is provided with a shaft 16 which is connected to a gate arm 17 in any conventional manner such as by a key 18. The gate arm 17 is provided with a pin bore which is aligned with a pin bore 19 provided in an operating lever arm 21. A shear pin 22 is disposed within the aligned common pin bores to connect the operating lever arm 21 to the hub link 17. The strain pin 22 will shear in the event refuse is caught between adjacent wicket gates which prevent them from closing, thereby protecting the wicket gate and the operating mechanisms. Formed in the operating lever arm 21 is an enlarged bore 23 which engages on an upwardly extending hub 26 of the gate arm 17.

Each wicket gate operating lever arm 21 is pivotally connected to the gate ring 11 which is rotated by means of servomotors (not shown). Such connection of each operating lever arm 21 to the gate ring 11 is accomplished by means of an eccentric pin drive means 25. Each drive means 25 is similar in construction and operation.

Figure 2:
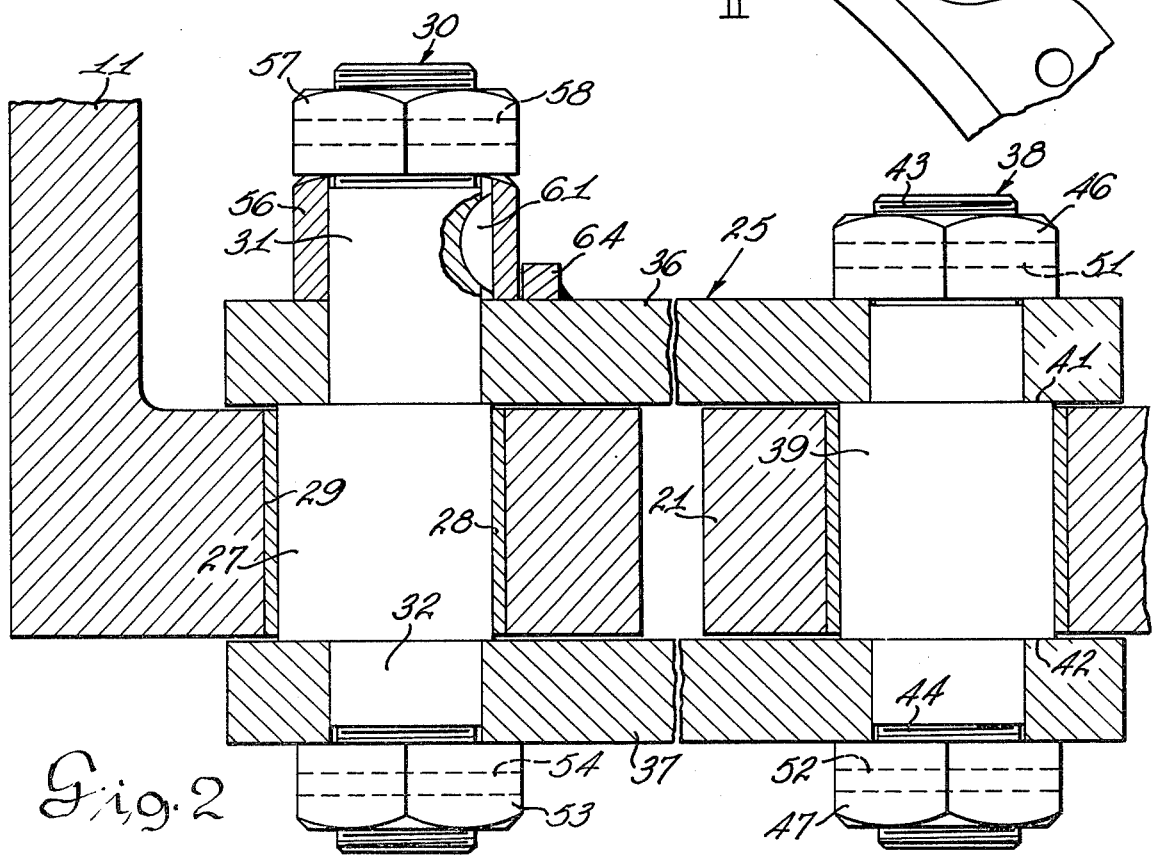

As shown in FIG. 2, each of the drive means 25 include an eccentric pin 30 having a cylindrical eccentric portion 27 which is disposed in a bushing 28 that is carried in bore 29 formed in the gate ring 11. The eccentric pin 30 is provided with axial aligned extensions 31 and 32 which extend in opposition directions from the eccentric portion 27. Two drive links 36 and 37 are mounted on the eccentric pin extensions 31 and 32, respectively. The opposite ends of the drive links 36 and 37 are engaged on a bolt 38. As shown, the bolt 38 is formed with an enlarged cylindrical center portion 39 which forms shoulders 41 and 42 on which the drive links 36 and 37 rest. The ends of the drive links 36 and 37 are pivotally secured to the threaded ends 43 and 44 of the bolt 38 by means of nuts 46 and 47. Pins 51 and 52 serve to lock the nuts 46 and 47 in holding position.

The lower drive link 37 is secured to the depending end 32 of the eccentric pin 26 by means of a threaded nut 53. A pin 54 locks the nut 53 to the end 32. The upper drive link 36 is pivotally secured to the upper end 31 of the eccentric pin 26 in abutting relationship with a shoulder formed by the eccentric portion 27 by a smooth bore sleeve nut 56 and a threaded nut 57 engaged on a threaded portion of the eccentric pin extension 31. A dowel pin 58 locks the nut 57 in an adjusted position abutting the sleeve nut 56. A woodruff key 61 acting between the axial movable sleeve nut 56 and the eccentric pin extension 31 prevents relative rotation between the eccentric pin 30 and the sleeve nut 56. However, the woodruff key 61 does not inhibit the axial movement of the sleeve nut 56 and it is free to move on the eccentric pin extension 31.

Preassembly of the drive means 25 associated with each wicket gate 14 can be accomplished in the fabrication shop. Such preassembly is done by moving each wicket gate 14 to full closed position as depicted in FIG. 1. With the wicket gates 14 closed, the eccentric pin 30, the two drive links 36 and 37, the sleeve nut 56, woodruff key 61 and the two lock nuts 53 and 57 are preassembled, the holes for the dowel pins 54 and 58 drilled and reamed and all components matchmarked.

In field assembly all components can be reassembled onto the gate ring 11 positioning the components in relation to the indications provided by the matchmarks. With drive means 25 reassembled, the dowel pins 54 and 58 are inserted through the respective locknuts 53 and 57 and the eccentric pin 30.

If for any reason a final field adjustment of the operating means 25 is necessary to establish the closed position for one or more of the wicket gates 14, the turning of the eccentric pin 30 may be accomplished by placing a wrench on either the locknut 57 or the sleeve nut 56 and turning it so as to effect the desired location of the wicket gate. To lock the eccentric pin 30 in the established position and prevent its rotation in the links 36 and 37, a small rectangular-shaped steel bar 64 is positioned on the link 36 against one of the flat sides of the sleeve nut 56 and tack welded to the link 36.

When disassembly is required for maintenance, such as replacing the bushing 28, the dowel pins 54 and 58 can be removed and the locknuts 53 and 57 removed from the eccentric pin 30. Also, the dowel pins 51 and 52 can be removed and the nuts 46 and 47 removed from the bolt 38. With the nut 57 removed from the eccentric pin 30, the sleeve nut 56 can be slipped off the eccentric pin and the woodruff key extracted from its seat. This frees the links 36 and 37 and they can be removed from the eccentric pin 30 and bolt 38. The eccentric pin 30 can be extracted from the bushing 28 freeing the bushing for removal from the gate ring 11.

To reassemble the components to the exact same adjustment point, all of the components are reinstalled in the exact same position as they were originally. Care should be taken to matchmark the flat surface of the sleeve nut 56 that is adjacent the locking bar 64 so that in reassembling the sleeve nut 56 the same flat surface will again be located adjacent the locking bar 64.

The embodiments of the invention in which an exclusive property or privilege is claimed are defined as follows:

1. In an operating mechanism for a wicket gate of a hydraulic turbine having wicket gate operating ring:

a bore in the wicket gate operating ring;

an eccentric pin having a cylindrical eccentric body portion the axis of which is offset but parallel to the axis of said pin, said cylindrical eccentric body portion being disposed within said bore of the wicket gate operating ring;

a wicket gate drive link operably connected to effect movement of said wicket gate, said drive link being secured to said eccentric pin to be driven thereby;

a sleeve nut mounted on said eccentric pin in abutting engagement with said drive link;

locking means engaged on said eccentric pin in engagement with said sleeve to lock said sleeve nut and said drive link to said eccentric pin;

removable means operating between said sleeve nut and said eccentric pin and operable to prevent relative rotational movement between said sleeve nut and said eccentric pin; and, means to secure said sleeve nut in an adjusted radial position and thereby maintain said eccentric pin in an adjusted radial position.

2. Operating mechanism according to claim 1 wherein said wicket gate drive link is operably connected to effect movement of the wicket gate through an operating lever arm which is adjustably secured to the wicket gate.

3. Operating mechanism according to claim 2 wherein said operating lever arm includes a gate arm keyed to a shaft of the wicket gate;

said operating lever arm is mounted on the hub of said gate arm and adjustably secured thereto; and, a strain pin operating between said gate arm and said operating lever arm to protect the operating mechanism in the event of the wicket gate being physically prevented from closing.

4. Operating mechanism according to claim 3 wherein said wicket gate drive link is pivotally and releasably secured to the free end of said operating lever.

5. Operating mechanism according to claim 1 wherein there is provided a bushing in the bore of the wicket gate operating ring and the cylindrical eccentric body portion of said eccentric pin is disposed within said bushing.

6. Operating mechanism according to claim 5 wherein said removable means operating between said sleeve nut and said eccentric pin to prevent relative rotation between said sleeve nut and said eccentric pin is a removable key seated in said eccentric pin and a keyway formed in said sleeve nut.

7. Operating mechanism according to claim 1 wherein said sleeve nut is provided with a plurality of external flat surfaces; and, said means to secure said sleeve nut in an adjusted position is a bar member tack welded to said wicket gate drive link in position on said wicket gate drive link against one of the external flat surfaces on said sleeve nut.

* * * * *